United States Patent
Lee et al.

(10) Patent No.: US 8,142,692 B2
(45) Date of Patent: Mar. 27, 2012

(54) MANUFACTURING METHOD OF A DISPLAY DEVICE

(75) Inventors: Sang-hoon Lee, Chungcheongnam-do (KR); Byung-yun Joo, Seoul (KR); Min-young Song, Seoul (KR); Dong-kwan Kim, Seoul (KR); Jin-sung Choi, Chungcheongnam-do (KR); Jin-soo Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 621 days.

(21) Appl. No.: 11/931,001

(22) Filed: Oct. 31, 2007

(65) Prior Publication Data
US 2008/0111259 A1    May 15, 2008

(30) Foreign Application Priority Data
Nov. 14, 2006  (KR) .......... 10-2006-0112197

(51) Int. Cl.
  *B29D 11/00* (2006.01)
  *B29C 65/00* (2006.01)
  *B28B 11/08* (2006.01)
  *B29C 59/00* (2006.01)
  *H01R 33/00* (2006.01)

(52) U.S. Cl. .......... 264/1.7; 264/1.1; 264/248; 264/249; 264/293; 264/319; 362/615

(58) Field of Classification Search .......... None
See application file for complete search history.

(56) References Cited

U.S. PATENT DOCUMENTS

| | | | | |
|---|---|---|---|---|
| 4,940,563 A | * | 7/1990 | Kromrey | 264/257 |
| 5,512,219 A | * | 4/1996 | Rowland et al. | 264/1.6 |
| 6,656,307 B2 | * | 12/2003 | Northey | 156/244.25 |
| 2004/0085749 A1 | * | 5/2004 | Parker et al. | 362/31 |
| 2006/0197243 A1 | * | 9/2006 | Ellenson et al. | 264/1.24 |

FOREIGN PATENT DOCUMENTS

| | | |
|---|---|---|
| JP | 2000249836 | 9/2000 |
| JP | 2004273238 | 9/2004 |
| JP | 2005142078 | 6/2005 |

OTHER PUBLICATIONS

Kipp, Dale O. (editor), Plastic Material Data Sheets, MatWeb, 2004, Dow PRIMACOR® 3440 Ethylene Acrylic Acid (EAA).*
Brandrup, J. (editor), Polymer Handbook, Wiley, 2005, 4th Edition, Glass Transition Temperatures of Polymers (No. 1010-1021 and 2225).*

* cited by examiner

*Primary Examiner* — Christina Johnson
*Assistant Examiner* — Benjamin Schiffman
(74) *Attorney, Agent, or Firm* — Cantor Colburn LLP

(57) ABSTRACT

A manufacturing method of an optical member includes forming an optical film which has a first glass transition temperature and includes a pattern formed on a surface of the optical film, and an optical plate which has a second glass transition temperature that is lower than the first glass transition temperature, disposing the optical film and the optical plate adjacent each other so that the pattern faces the optical plate, pressurizing the optical film and the optical plate while heating the optical plate to the second glass transition temperature or higher, and forming the optical member by the pressurizing and the heating.

18 Claims, 14 Drawing Sheets

MANUFACTURING METHOD OF A DISPLAY DEVICE

This application claims priority to Korean Patent Application No. 2006-0112197, filed on Nov. 14, 2006, and all the benefits accruing therefrom under 35 U.S.C. §119, the contents of which in its entirety area incorporated herein by reference.

BACKGROUND OF THE INVENTION

1. Field of the Invention

Apparatuses and methods consistent with the present invention relate to a manufacturing method of an optical member which is used in a display device.

2. Description of the Related Art

A flat display device such as a liquid crystal display ("LCD") device, a plasma display panel ("PDP") or an organic light emitting diode ("OLED") has been developed to replace a cathode ray tube ("CRT"). The LCD device includes a liquid crystal display panel and a backlight unit to supply light to the liquid crystal display panel.

The backlight unit is classified as an edge type or a direct type according to a position of a light source. The edge type employs a light source in a lateral part of a light guiding plate and thus is used in a small liquid crystal display device such as a laptop computer or a desktop computer. The edge type backlight unit has good light uniformity and long life span, and is advantageous in making an LCD device with a small thickness.

In the edge type backlight unit, the light guiding plate guides a light incident from a lateral part thereof to emit the light in the direction of liquid crystal display panel. The light guiding plate has been upgraded to add a function as an optical film to improve brightness of the light emitted therefrom. The upgraded light guiding plate forms a light-collecting pattern on an emission side thereof and improves brightness of the emitted light.

However, the upgraded light guiding plate is formed by an injection molding or its light-collecting pattern is additionally formed by using ultraviolet curing resin, thereby causing high production costs.

BRIEF SUMMARY OF THE INVENTION

An exemplary embodiment provides a method to reduce production costs of manufacturing an optical member which has a pattern.

An exemplary embodiment provides a manufacturing method of an optical member. The method includes providing an optical film which has a first glass transition temperature and includes a pattern formed on a surface thereof, and an optical plate which has a second glass transition temperature that is lower than the first glass transition temperature, disposing the optical film and the optical plate adjacent to each other so that the pattern faces the optical plate; pressurizing the optical film and the optical plate together while heating the optical plate to about the second glass transition temperature or greater and forming the optical member by the pressurizing and the heating.

In an exemplary embodiment the optical plate is heated to a heating temperature in a temperature range of about the second glass transition temperature to about the second glass transition temperature plus 30° C.

According to an aspect of the invention, the first glass transition temperature is greater than a heating temperature of the optical plate.

In an exemplary embodiment, the pressurizing of the optical film and the optical plate includes immersing the optical film and the optical plate into a liquid and pressurizing the liquid to a pressure.

In an exemplary embodiment, the liquid includes water.

In an exemplary embodiment, the pressure of the liquid is about 80 atmospheric pressure to about 120 atmospheric pressure.

In an exemplary embodiment, the liquid does not exist between the pattern and the optical plate during pressurizing of the liquid.

In an exemplary embodiment, the method further includes covering the optical plate and the optical member with a protection member that encloses the optical plate before the optical plate is heated.

In an exemplary embodiment, the method further includes sealing the optical plate and the optical member within the protection member and processing the protection member covering the optical plate and the optical member to be vacuous.

In an exemplary embodiment, the protection member includes resin, and a third glass transition temperature of the protection member is greater than a heating temperature of the optical plate.

In an exemplary embodiment, the optical plate includes linear polymers and the pattern is formed using cross-linked polymers.

In an exemplary embodiment, the pattern includes a light-collecting pattern.

An exemplary embodiment provides a manufacturing method of an optical member. The method includes providing an optical plate and an optical film which has a pattern formed on a surface thereof, arranging the optical film and the optical plate adjacent to and facing each other in a protection member so that the pattern faces the optical plate, sealing the optical film and optical plate within the protection member, immersing the protection member in a liquid, heating and pressurizing the liquid; separating the pressurized optical plate and the optical film and forming the optical member.

In an exemplary embodiment, the heating and pressurizing the liquid induces pliability in the optical plate.

In an exemplary embodiment, the heating temperature ranges from about a glass transition temperature of the optical plate to about the glass transition temperature of the optical plate plus 30° C.

In an exemplary embodiment, the pattern includes a prism pattern.

In an exemplary embodiment, the pattern is formed by cross-linking polymers.

BRIEF DESCRIPTION OF THE DRAWINGS

The above and/or other aspects and advantages of the present invention will become apparent by describing in further detail exemplary embodiments thereof with respect to the accompanying drawings, in which.

DETAILED DESCRIPTION OF EXEMPLARY EMBODIMENTS

Figure 1:
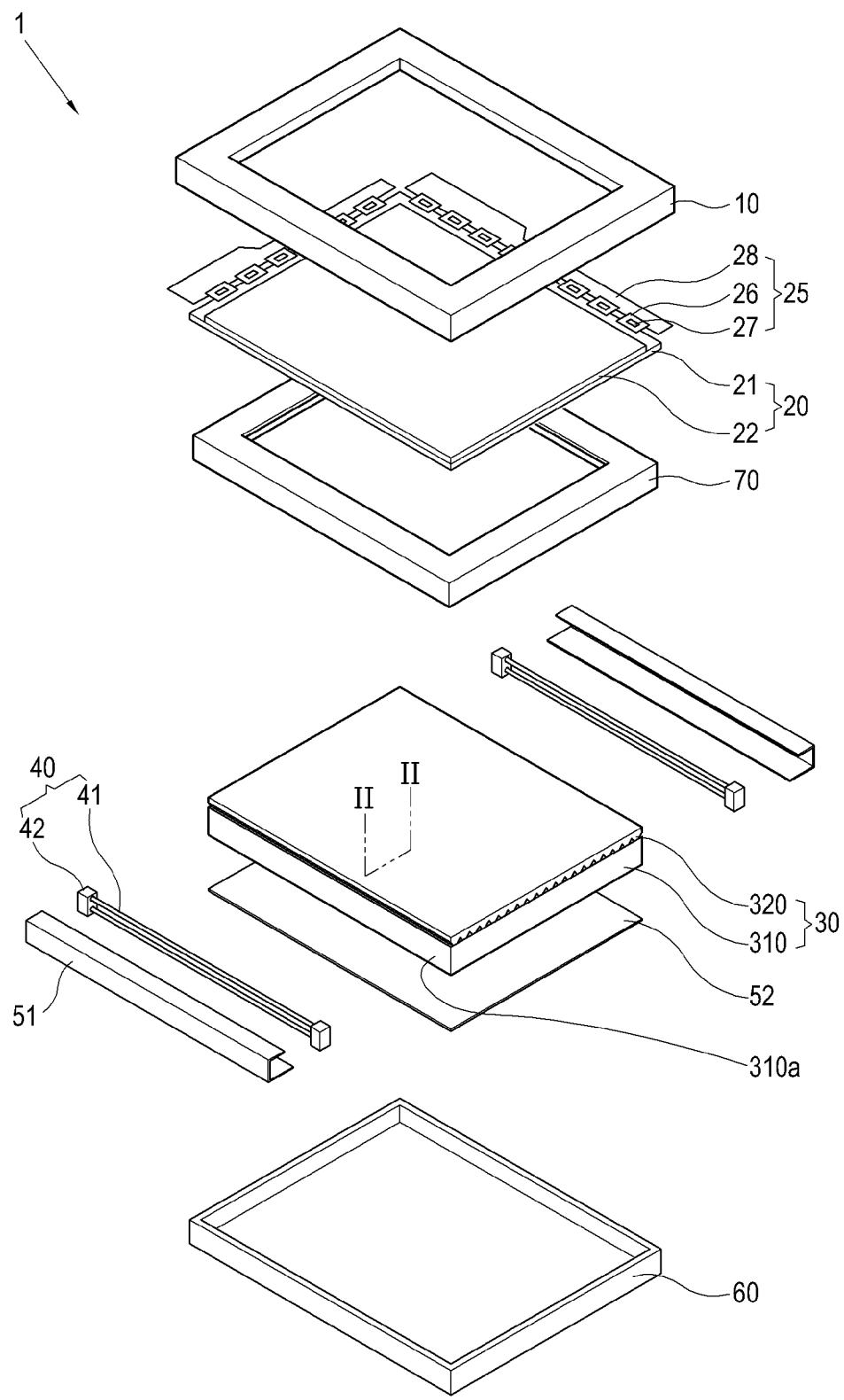
FIG. 1 is an exploded perspective view of an exemplary embodiment of a liquid crystal display device which includes an optical member manufactured according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

An exemplary embodiment of a liquid crystal display device including an optical member which is manufactured according to the present invention will be described with reference to FIGS. 1 and 2.

A liquid crystal display ("LCD") device 1 includes a liquid crystal display panel 20, an optical member 30 which is disposed behind the liquid crystal display panel 20 (e.g., on a lower side opposing a viewing side of the LCD device 1), a pair of light sources 40 each of which being disposed along opposing sides of the optical member 30, a light source cover 51 which covers the light sources 40 and a reflection plate 52 disposed under the optical member 30. The foregoing elements are accommodated between an upper covering member 10 and a lower covering member 60. The liquid crystal display panel 20 is disposed in a mold 70 which is positioned above the optical member 30.

The liquid crystal display panel 20 includes a thin film transistor substrate 21 on which a thin film transistor is formed, and a color filter substrate 22 which faces the thin film transistor substrate 21. A liquid crystal layer (not shown) is disposed between the thin film transistor substrate 21 and the color filter substrate 22. While forming images by adjusting an arrangement of the liquid crystal layer, the liquid crystal display panel 20 does not emit light itself and thus require light from a light source. In the illustrated exemplary embodiment, light from the light sources 40 that are disposed behind the liquid crystal display panel 20 generate light to be transmitted and received by the liquid crystal panel 20.

A driver 25 is provided at a lateral portion of the thin film transistor substrate 21 and supplies a driving signal to the liquid crystal panel 20. The driver 25 includes a flexible printed circuit board ("FPC") 26, a driving chip 27 which disposed on, such as embedded in the FPC 26, and a printed circuit board ("PCB") 28 which is connected at a side of the FPC 26. In the illustrated embodiment, the driver 25 provided by a chip on film ("COF") method, but is not limited thereto. Alternatively, the driver 25 may be provided by any of a number of other methods suitable for the purpose described herein including, but not limited to, a tape carrier package ("TCP") and a chip on glass ("COG"). In an alternative exemplary embodiment, the driver 25 may be embedded in the thin film transistor substrate 21, instead of the FPC 26.

The optical member 30 is disposed behind the liquid crystal display panel 20 and includes an optical plate 310 and an optical film 320. Referring to FIG. 2, the optical film 320 includes a film main body 321 and a prism pattern 322, such as a prism pattern. An end (e.g., a base) of the prism pattern 322 is connected with a surface (e.g., an upper surface) of the optical plate 310. The optical member 30 is arranged and configured so that the optical film 320 is disposed on a side of the optical member 30 toward the liquid crystal display panel 20. That is, the optical film 320 is disposed in a pathway of and in a direction which light is being transmitted to the liquid crystal display panel 20 from the light source 40.

The optical member 30 emits, through the optical film 320, the light that is incident from the incident surface 310a of the optical plate 310, and transmits the light toward the liquid crystal display panel 20.

The optical plate 310 changes a substantially line light source into a surface light source. In an exemplary embodiment, the optical plate 310 may include, but is not limited to, acrylic resin such as polymethyl methacrylate ("PMMA"). Various patterns (not shown) may be formed on a surface of the optical plate 310 facing the reflection plate 52, to reflect the incident light to the liquid crystal display panel 20. The patterns may include, but are not limited to, a dot pattern, a V-cut pattern, a prism pattern, and other patterns suitable for the purpose described herein.

The optical film 320 faces the liquid crystal display panel 20. The optical film 320 may include, but is not limited to, polycarbonate resin, poly vinyl chloride ("PVC") resin, etc. In an exemplary embodiment, the optical film 320 may include a transparent material. Referring again to FIG. 2, the prism pattern 322 is connected with an emission side 310b of the optical plate 310. The prism pattern 322 extends in a longitudinal direction, such as parallel with the light sources 40. The prism pattern 322 is arranged at predetermined intervals, such as in a transverse direction of the optical member 30.

In an exemplary embodiment, the optical member 30 may be manufactured by combining separate elements of the optical plate 310 and the optical film 320, such as is illustrated in FIG. 1. Alternatively, the optical member 30 may be integrally formed, whereby the optical plate 310 and optical film 320 form a single unit piece, such as is illustrated in FIG. 2. Exemplary embodiments and details relating to a manufacturing method will be described later.

Light flow of the optical member 30 will be described with reference to FIG. 2.

Light "a" as indicated by the broken arrowed line is incident on portions of the emission side 310b of the optical plate 310 that are not connected or occupied with the prism pattern 322. The light "a" may be totally-reflected and travel through the optical plate 310. The light "a" is totally-reflected when an incident angle of light to the emission side 310b is smaller than a critical angle for the total-reflection. If the incident angle is larger than the critical angle, the light "a" is emitted through the emission side 310b of the optical plate 310.

Light "b" which is incident to remaining portions of the emission side 310b connected or occupied by the prism pattern 322, enters the prism pattern 322. The light "b" which enters the prism pattern 322 is reflected from a lateral part (e.g., inclined surface) of the prism pattern 322. A progress direction of the light "b" is changed to a substantially vertical direction relative to a (incident) surface of the liquid crystal display panel 20, thereby enhancing brightness of the display of the liquid crystal device 1.

As described above, the optical member 30 is configured to both guide and collect light.

In another exemplary embodiment of the present invention, the film main body 321 and the prism pattern 322 may be formed in different layers and include different materials.

Referring again to FIG. 1, the light sources 40 are provided in a pair and respectively face opposing incident sides 310a of the optical plate 310. A longitudinal extension direction of the light sources 40 is substantially in parallel with that of a prism pattern 322. The light sources 40 include a lamp main body 41 and lamp holders 42 which are disposed on opposing ends of the lamp main body 41. The lamp holders 42 may have a hexahedral shape as illustrated in the embodiment. The lamp holders 42 cover an electrode (not shown) disposed at the opposite ends of the lamp main body 41 and may include a plastic material. In exemplary embodiments, the light sources 40 may include a cold cathode fluorescent lamp ("CCFL") or an external electrode fluorescent lamp ("EEFL"). Alternatively, the light sources 40 may include a light emitting diode ("LED").

The light source cover 51 covers the light sources 40 so that light from the light sources 40 reflects toward the incident side 310a of the optical member 310. In an exemplary embodiment, the light source cover 51 may include aluminum or galvanized iron ("GI").

The reflection plate 52 is disposed under the optical member 310 and reflects light originally directed downwards toward the optical member 30. In an exemplary embodiment, the reflection plate 52 may include a plastic material such as polyethylene terephthalate ("PET") or polycarbonate ("PC").

In another exemplary embodiment, the liquid crystal display device may include additional optical members (not shown). Optical members may include, but are not limited to, a prism film, a diffusion film, a reflective polarizing film and/or a protection film, and may be disposed between the optical member 30 and the liquid crystal display panel 20.

As described above, the optical member 30 both guides and collects light. An exemplary embodiment of manufacturing method of the optical member 30 according to the present invention will be described with reference to FIGS. 3A to 3D.

Figure 3A:
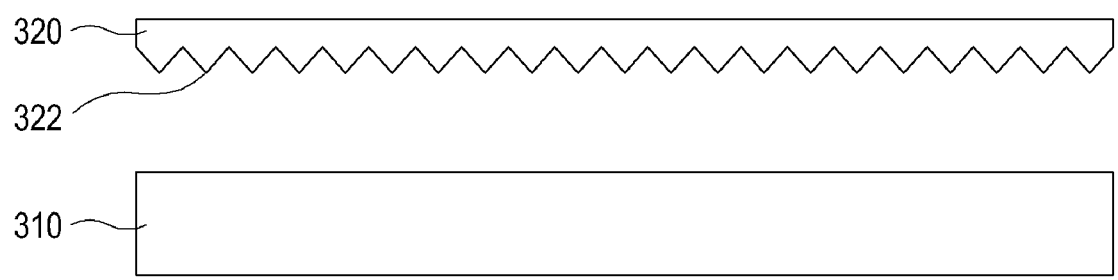
FIGS. 3A to 3D illustrate an exemplary embodiment of a manufacturing method of the optical member according to the present invention.

As shown in FIG. 3A, the optical plate 310 and the optical film 320 are disposed facing each other. The prism pattern 322, such as a light-collecting pattern, is formed on one surface of the optical film 320. The prism pattern 322 is disposed to face the optical plate 310.

In the illustrated embodiment, the optical plate 310 may include polymethyl methacrylate ("PMMA") whose glass transition temperature ("Tg") is approximately 105. The optical film 320 may include resin whose glass transition temperature is higher than that of polymethyl methacrylate ("PMMA"). In one exemplary embodiment, the optical film 320 may include polycarbonate ("PC") whose glass transition temperature ("Tg") is approximately 155° C.

Figure 3B:
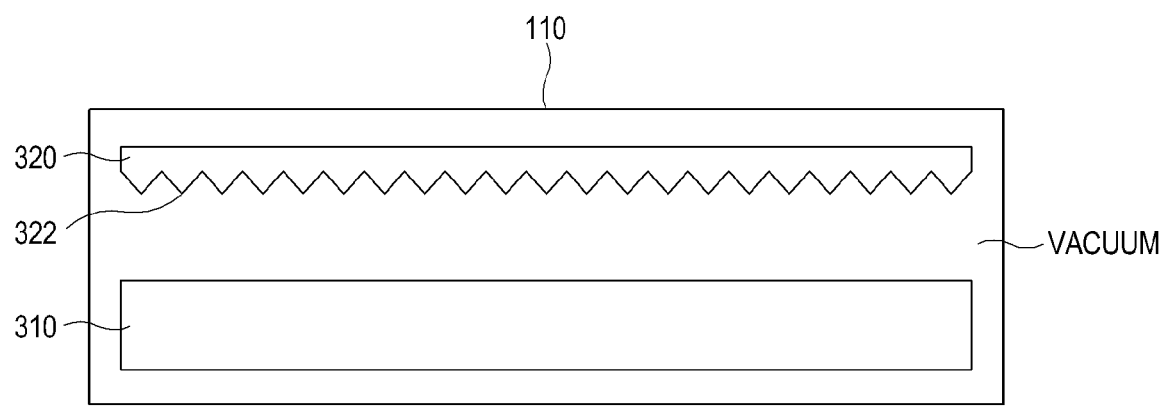

As shown in FIG. 3B, the optical plate 310 and the optical film 320 are covered by a protection member 110. In an exemplary embodiment, the protection member 110 may include a resin film. While the optical plate 310 and the optical film 320 are enclosed in the protection member 110, the protection member 110 becomes vacuous, e.g., such as by applying a vacuum to the protection member 110, optical plate 310 and optical film 320. The protection member 110 prevents outside elements, such as water or air, from being disposed between the optical plate 310 and the optical film 320 when they are pressurized at a subsequent stage of manufacturing.

Figure 3C:
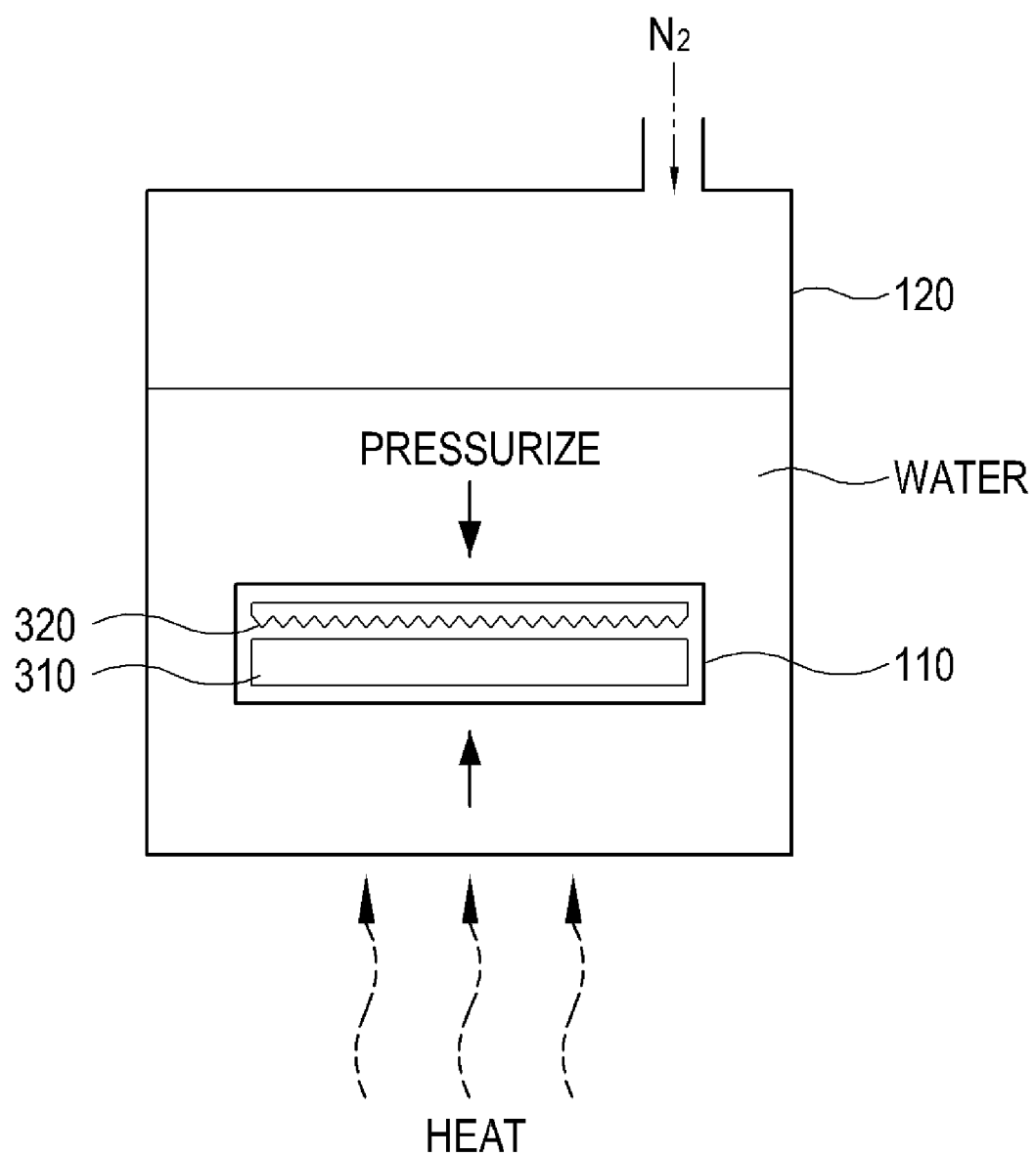

As shown in FIG. 3C, the protection member 110 accommodating the optical plate 310 and the optical film 320 are put in a pressure container 120 to be heated and pressurized. The pressure container 120 is filled with a pressure medium and a heating medium. As in the illustrated embodiment, the protection member 110 is immersed in water as the pressure medium and the heating medium. The water is nontoxic and has a relatively low extrusion rate relative to the pressure, thereby qualifying the water as a proper heating and pressure medium. In an alternative exemplary embodiment of the present invention, oil may be used as a pressure medium.

The optical plate 310 is heated, such as to be changed into a flexible or deformable, e.g., rubbery state, while being pressurized. When the optical plate 310 is heated, the optical film 320 is also heated. However, the optical film 320 may not be modified into a rubbery state as the optical plate. If the glass transition temperature of the optical plate 310 is about 105° C. and that of the optical film 320 is about 155° C., the optical plate 310 may be heated to a heating temperature in a predetermined temperature range from about 105° C. to about 135° C., e.g., approximately 30° C. greater than the glass transition temperature of the optical plate 310. In an exemplary embodiment, the protection member 110 may include resin which is not glass-transitioned at the predetermined temperature range. As the protection member 110 accommodating the optical plate 310 and the optical film 320 are disposed in the water, the optical plate 310 is heated by heating the water.

The protection member 110 is pressurized by applying nitrogen (or alternatively, air) to the pressure container 120. The water is pressurized by nitrogen, and the optical plate 310 and the optical film 320 are pressed together. In one exemplary embodiment, the optical plate 310 and the optical film 320 may be pressurized within a range of about 80 atmospheric pressure to about 120 atmospheric pressure. Even if heated to about 100° C. or above, the water remains as a liquid due to the high pressure.

Figure 3D:
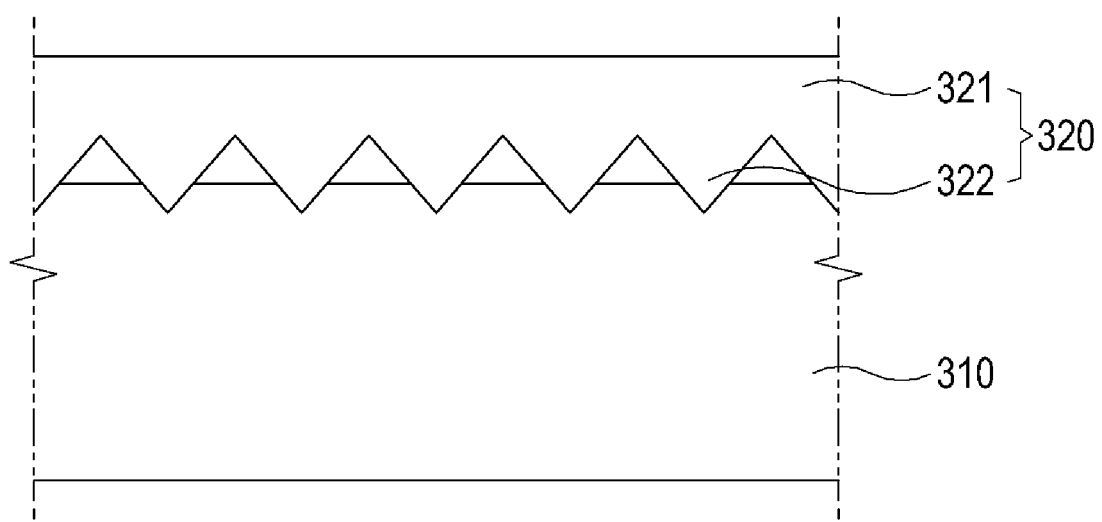

The optical plate 310 and the optical film 320 are combined with each other by applying the heat and pressure, which will be described with reference to FIG. 3D.

When heated in accordance with the illustrated embodiment, the surface of the optical plate 310 becomes relatively soft due to its rubber-like property. The prism pattern 322, in contrast, is not heated to the rubbery state, and remains more rigid than the optical plate 310. In exemplary embodiments, the rigidness of the prism pattern 322 may be varied by forming the prism pattern 322 including cross-linked polymers and the optical plate 310 may include linear polymers.

If the optical plate 310 and the prism pattern 322 are pressed together, an end (e.g., an apex of the triangular prism) of the prism pattern 322 which is more rigid than the optical plate 310, penetrates a surface of the optical plate 310 and thus combines with the optical plate 310. In this exemplary embodiment, water does not exist between the prism pattern 322 and the optical plate 310 since the protection member 110 prevents water from penetrating into the prism pattern 322. If the water does exist between the prism pattern 322 and the optical plate 310, then the pressurization was not efficiently done.

In the exemplary embodiment, the water provides for a substantially uniform pressurization of the optical plate 310 and the optical film 320 and thus the optical plate 310 and prism pattern 322 are substantially uniformly formed.

Once the optical plate 310 and the prism pattern 322 are combined, the pressurization may be ceased. Once the pressurization is stopped, the protection member 110 is removed from the pressure container 120 and separated from the optical plate 310 and the optical film 320.

In exemplary embodiments, the optical film 320 may not be totally penetrated into the optical plate 310. As illustrated in FIG. 3D, a space or gap is formed between adjacent prism patterns 322. That is, the optical film 321 and the optical plate 310 may be separated in a direction substantially perpendicular to an upper surface of the optical plate by a predetermined distance. Alternatively, the upper surface of the optical plate 310 and a lower surface of the optical film 320 may substantially completely contact each other, such as when profiles of the upper surface of the optical plate 310 and a lower surface of the optical film 320 correspond to each other.

Another exemplary embodiment of a manufacturing method of an optical member 30 according to the present invention will be described with reference to FIG. 4.

Several pairs of optical plates 310 and optical films 320 are disposed in a protection member 110. A combination preventing member 115, e.g., a separation member, is disposed between adjacent optical members 30, each optical member including an optical plate 310 and an optical film 320. Adjacent optical members 30 are not combined with each other. In exemplary embodiments, the combination preventing member 115 may include the same material as the protection member 110.

Figure 2:
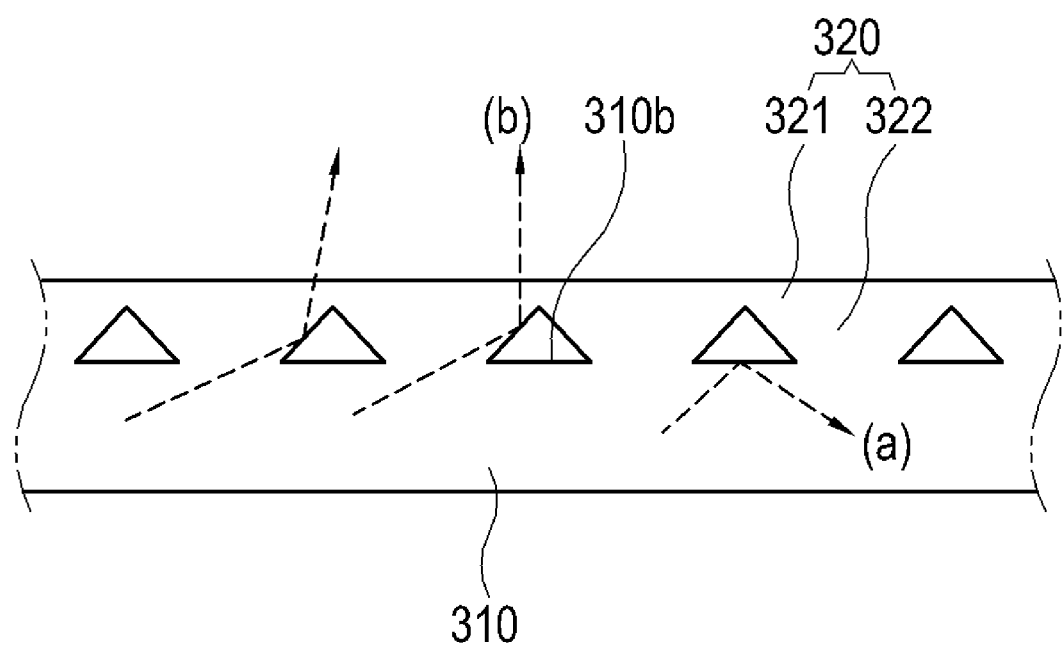
FIG. 2 is a cross-sectional view of the optical member, taken along line II-II in FIG. 1.
Figure 4:
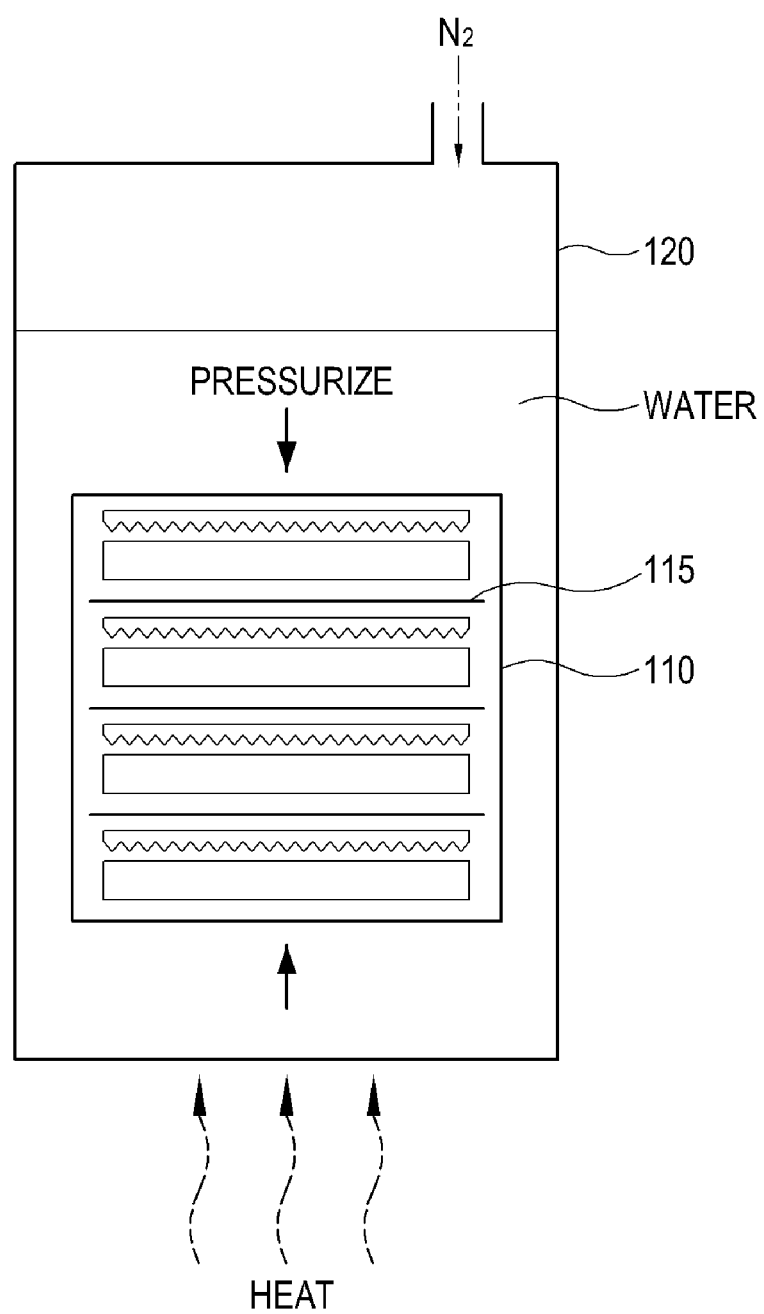
FIGS. 4 and 5 illustrate another exemplary embodiments of a manufacturing method of an optical member according to the present invention.

The manufacturing method of the optical member 30 illustrated in FIG. 4 is substantially similar to that of the optical member 30 in FIGS. 1-3. According to the exemplary embodiment illustrated in FIG. 4, a plurality of optical members 30 may be substantially simultaneously manufactured, thereby reducing production costs. In an alternative exemplary embodiment, a frame (not shown) may be used to support the optical plate 310 and the optical film 320 as necessary.

Another exemplary embodiment of a manufacturing method of an optical member 30 according to the present invention will be described with reference to FIG. 5.

A plurality of protection members 110 is provided in a pressure container 120. An optical plate 310 and an optical film 320 are provided in each of the respective protection members 110.

Figure 5:
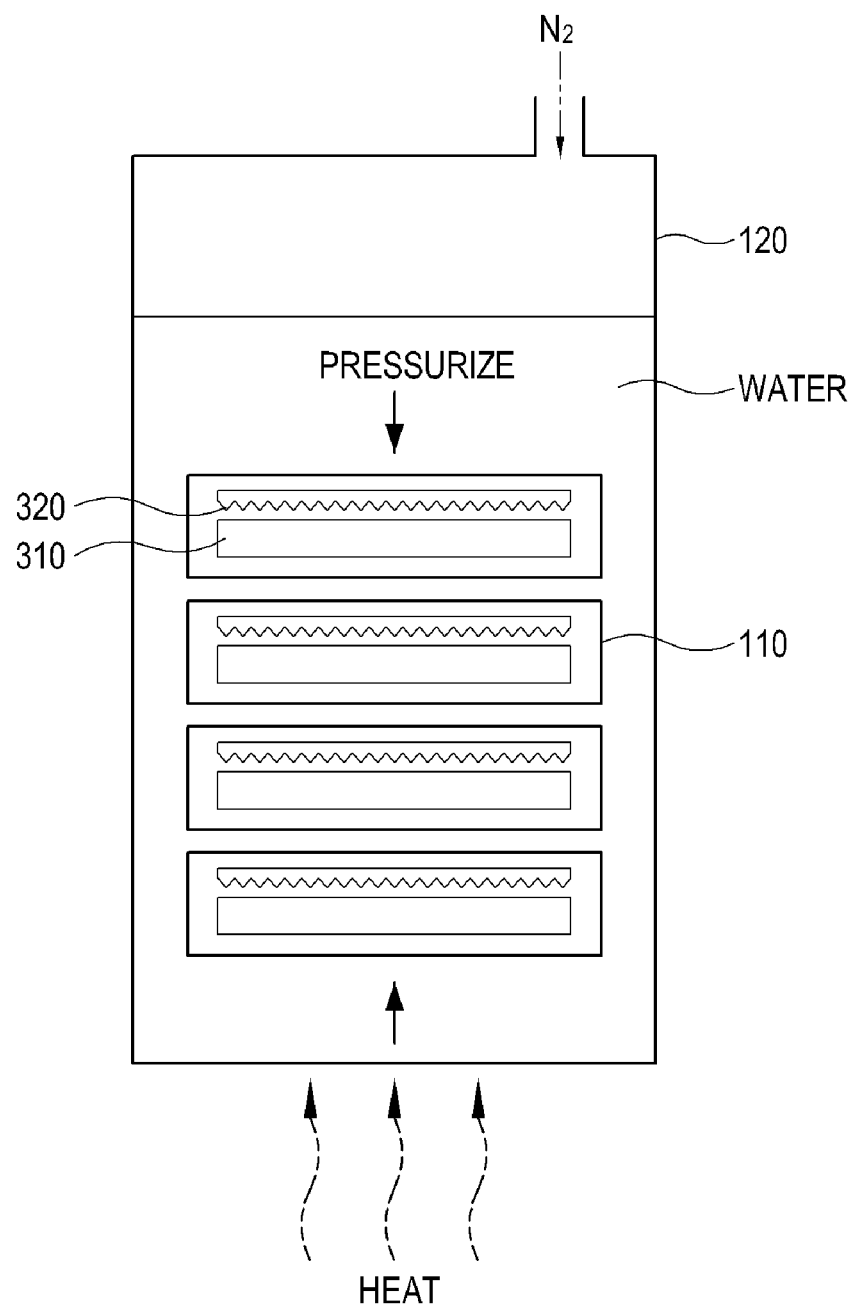

The manufacturing method as illustrated in FIG. 5 is substantially similar to that of the optical member 30 in FIGS. 1-3. In the illustrated embodiment of FIG. 5, multiple optical members 30 may be manufactured at substantially a same time, thereby reducing production costs.

In an alternative exemplary embodiment, an optical film 320 may be provided on each of opposing sides of an optical plate 310 to be heated and pressurized. In this case, the optical films 320 are combined with the opposing sides of the optical plate 310.

Figure 6:
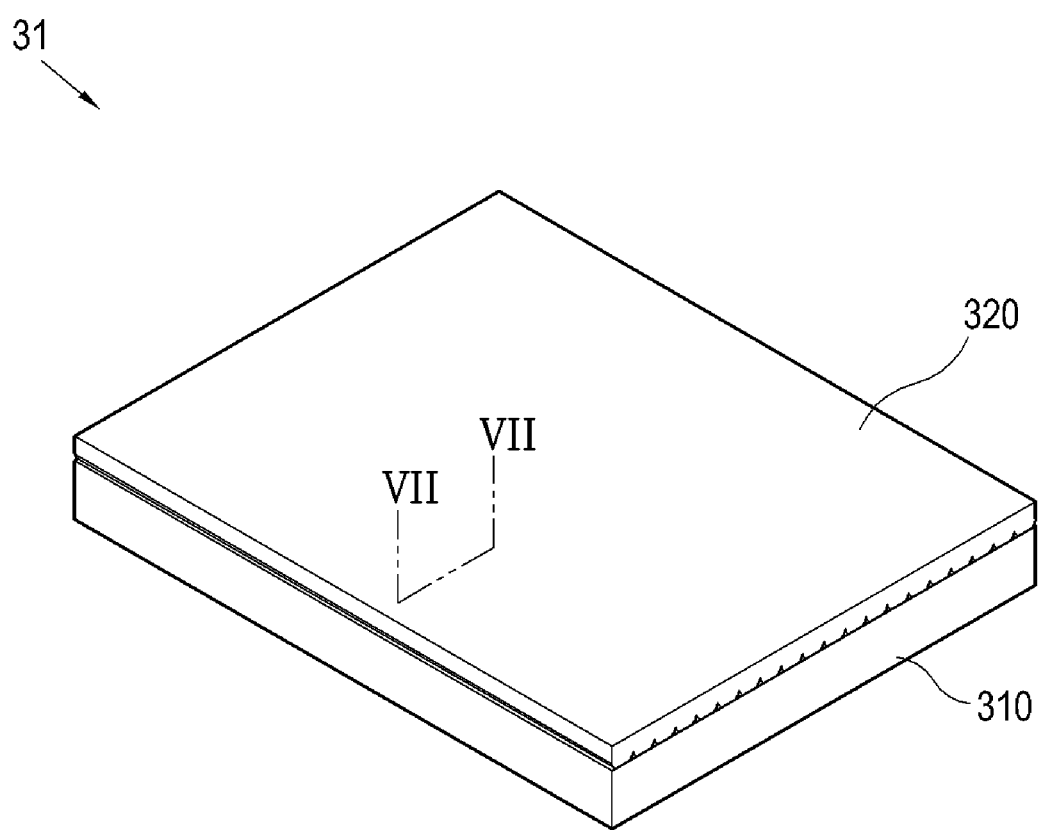
FIG. 6 is a perspective view of another exemplary embodiment of an optical member which is manufactured according to the present invention.
Figure 7:
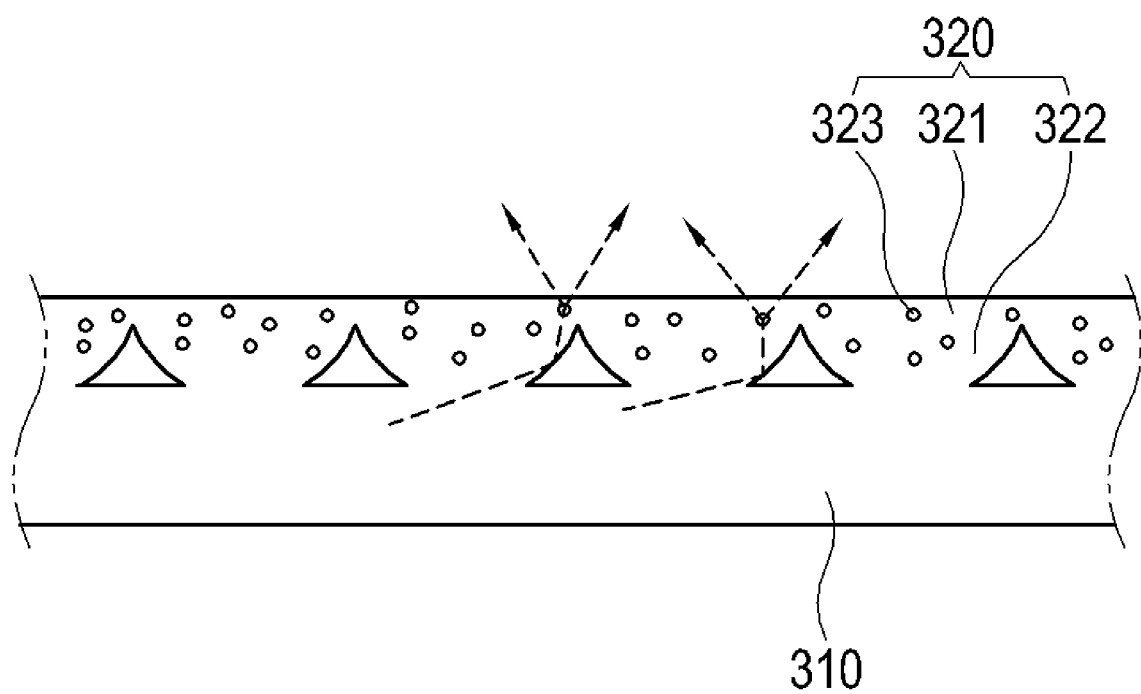
FIG. 7 is a sectional view of the optical member, taken along line VII-VII in FIG. 6.

Another exemplary embodiment of an optical member 31 manufactured in accordance with the present invention will be described with reference to FIGS. 6 and 7.

An optical film 320 includes a film main body 321, lens patterns 322, such as a light-collecting pattern, and a diffusion member 323 which is scattered in the film main body 321. The lens patterns 322 extend in a longitudinal direction and are disposed substantially in parallel with each other.

Light is collected while traveling through the lens patterns 322, and is diffused by the diffusion member 323 to be supplied to a liquid crystal display panel 20 (FIG. 1).

Since the optical member 31 performs a diffusion function, a diffusion film may be omitted.

Figure 8:
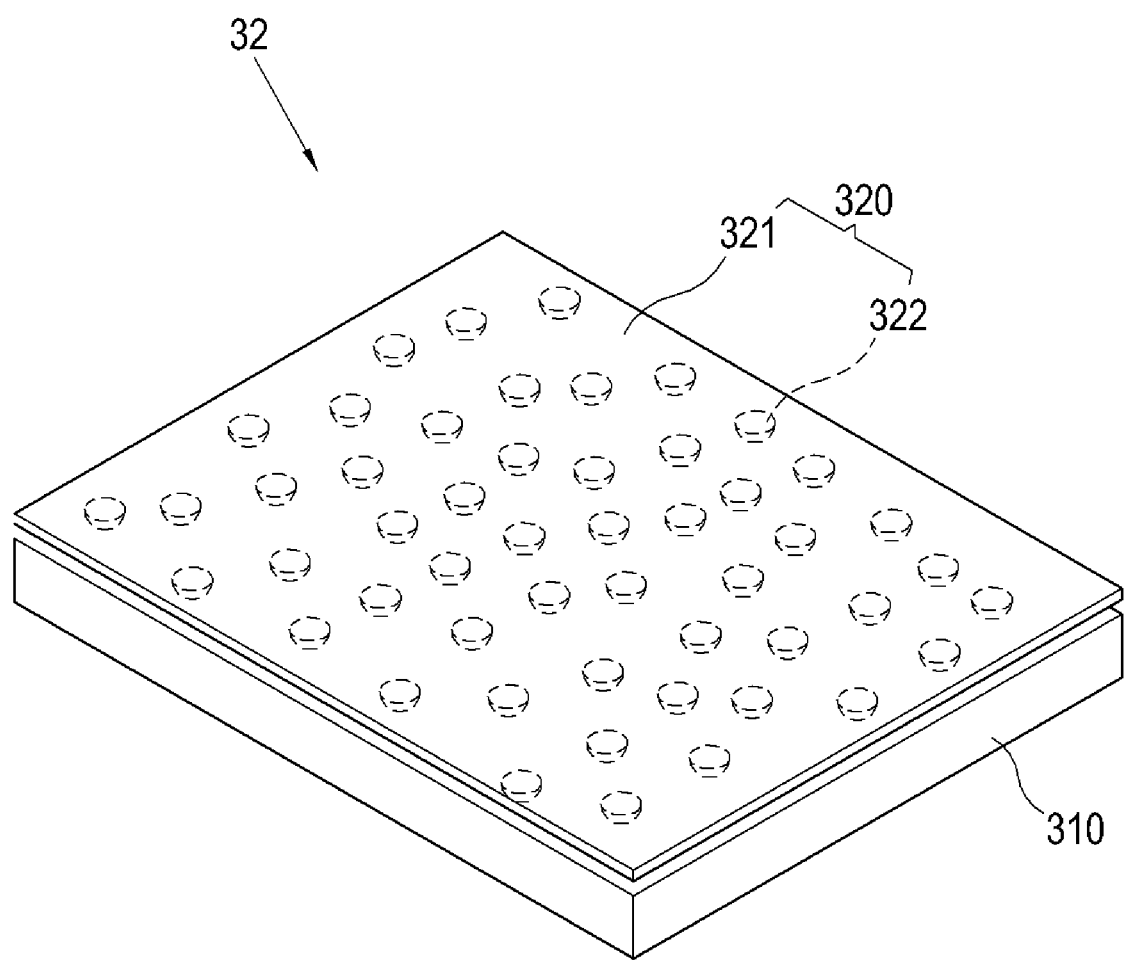
FIG. 8 is a perspective view of another exemplary embodiment of an optical member which is manufactured according to the present invention.

Another exemplary embodiment of an optical member 32 manufactured in accordance with the present invention will be described with reference to FIG. 8.

A light-collecting pattern 322 of an optical film 320 is arranged substantially in a discrete, e.g., dot pattern, instead of being disposed in elongated members. While FIG. 8 illustrates a dot pattern, the invention is not limited thereto, and any of a number of various patterns suitable for the purpose described herein may be provided in the optical film 320.

Figure 9:
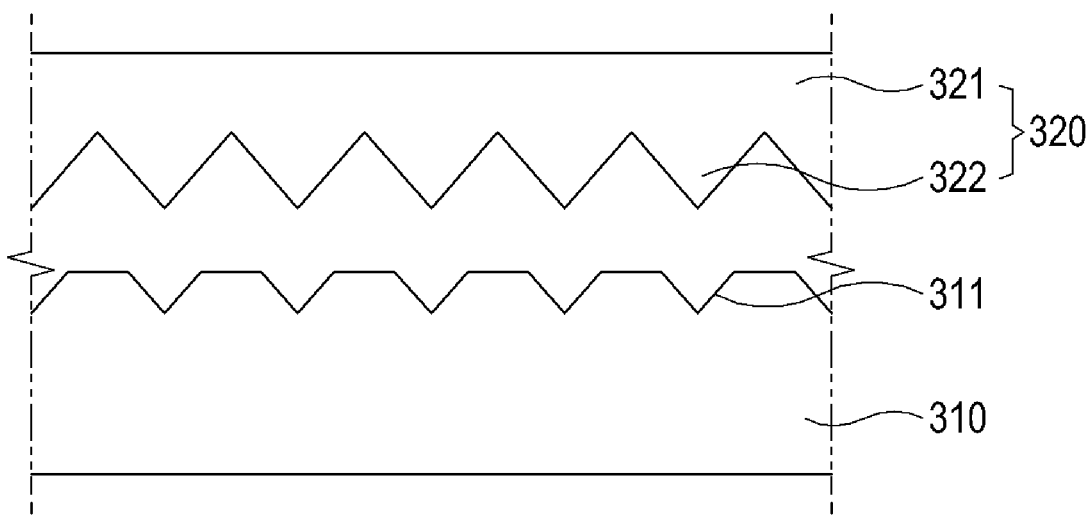
FIGS. 9 to 11 illustrate other exemplary embodiments of a manufacturing method of an optical member according to the present invention.

Another exemplary embodiment of a manufacturing method of an optical member according to the present invention will be described with reference to FIG. 9.

According to the illustrated exemplary, an optical plate 310 and an optical film 320 are separated from each other after being pressurized. A profile of the prism pattern 322 is partially transferred to the optical plate 310 by heat and pressure to form a concave prism pattern 311 in the optical plate 310. The pattern transferred to the optical plate 310 substantially corresponds to the profile of the prism pattern 322 of the optical film 320.

In an exemplary embodiment, the optical film 320 used in transferring the prism pattern 322 to one optical plate 310, may be used again in transferring the prism 322 pattern to another other optical plate 310.

Figure 10:
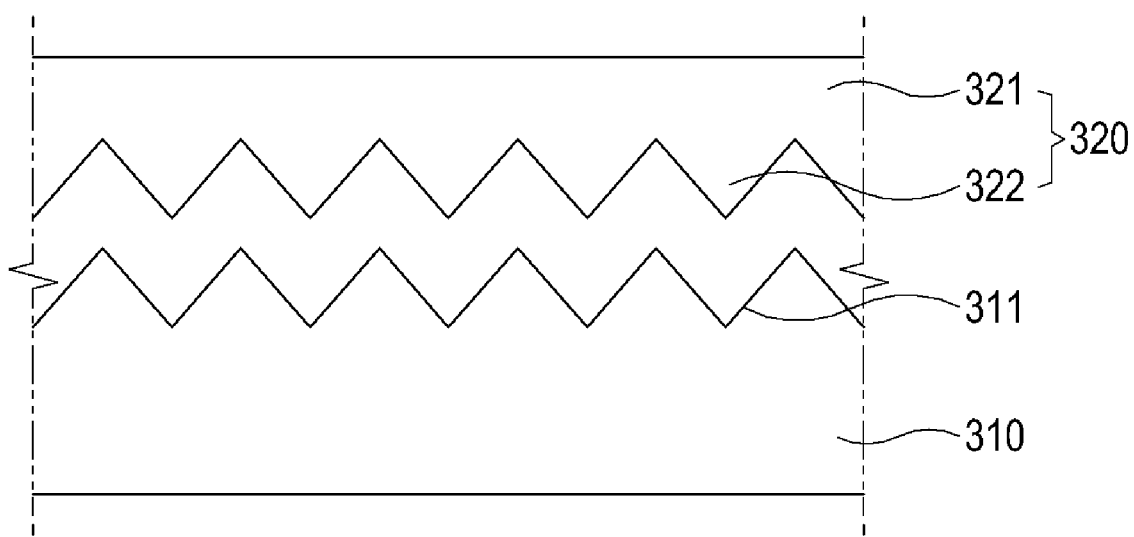

Another exemplary embodiment of a manufacturing method of an optical member according to the present invention will be described with reference to FIG. 10.

According to the illustrated embodiment, a prism pattern 322 of an optical film 320 is completely transferred to an optical plate 310. A concave prism pattern 311 of the optical plate 310 has substantially the same size and shape as the prism pattern 322 of the optical film 320, e.g., they correspond. Inclined surfaces of the prism pattern 311 of the optical plate 310 and inclined surfaces of the prism pattern 322 of the optical film 320 substantially contact each other so as to form no space or gap between the prism pattern 322.

Another exemplary embodiment of a manufacturing method of an optical member according to the present invention will be described with reference to FIG. 11.

According to the illustrated embodiment, optical films 320a and 320b are disposed at both of opposing sides of an optical plate 310. Concave prism patterns 311a and 311b are formed on the both opposing sides of the optical plate 310. A prism pattern of optical films 320a and 320b are completely transferred to the optical plate 310. Concave prism patterns 311a and 311b of the optical plate 310 has substantially the same size and shape as the prism patterns of the optical film 320, e.g., they correspond.

Figure 11:
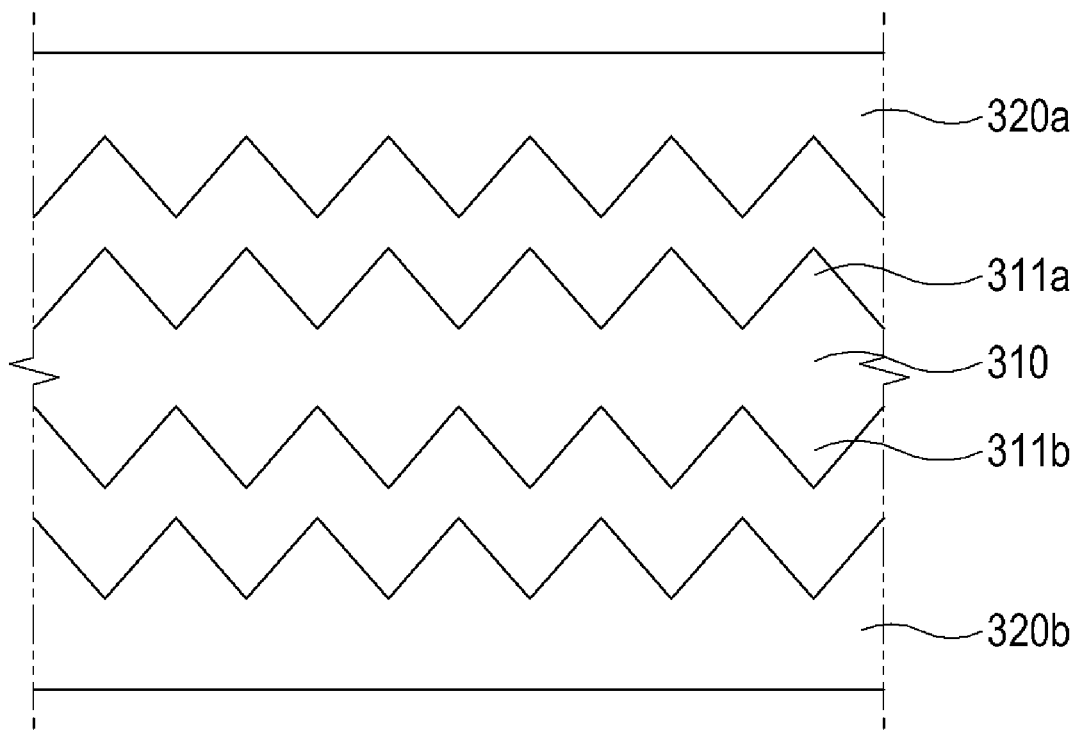

In an exemplary embodiment, the concave prism patterns 311a and 311b may extend in directions at right angles to each other, instead of being substantially parallel to each other as illustrated in FIG. 11. Also, different patterns, e.g., in shape, dimension and/or extension direction, may be formed on the opposing sides of the optical plate 310.

As in the illustrated embodiments, the present invention provides a manufacturing method of an optical member including a light guiding and collecting pattern, with a lower production cost.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A manufacturing method of a display device, the method comprising:
    forming an optical film having a first glass transition temperature and including a pattern formed on a surface thereof, and an optical plate including a linear polymer and having a second glass transition temperature, the second glass transition temperature being lower than the first glass transition temperature;
    disposing the optical film and the optical plate adjacent each other so that the pattern faces an upper surface of the optical plate;
    pressurizing the optical film and the optical plate while heating both the optical film the optical plate to the second glass transition temperature or greater, such that the pattern of the optical film penetrates the upper surface of the optical plate, and the optical film and the optical plate collectively form a single body of an optical member; and
    disposing the optical member under a display panel to emit a light to the display panel;
    wherein the optical member is transparent.

2. The manufacturing method according to claim 1, wherein the optical plate is heated to a heating temperature in a temperature range of about the second glass transition temperature to about the second glass transition temperature plus 30° C.

3. The manufacturing method according to claim 1, wherein the first glass transition temperature is greater than the heating temperature of the optical plate.

4. The manufacturing method according to claim 1, wherein the pressurizing of the optical film and the optical plate comprises immersing the optical film and the optical plate into a liquid and pressurizing the liquid to a pressure.

5. The manufacturing method according to claim 4, wherein the liquid includes water.

6. The manufacturing method according to claim 5, wherein the optical plate includes linear polymers and the pattern includes cross-linked polymers.

7. The manufacturing method according to claim 5, wherein the pattern includes a light-collecting pattern.

8. The manufacturing method according to claim 4, wherein the pressure of the liquid is about 80 atmospheres to about 120 atmospheres.

9. The manufacturing method according to claim 4, wherein the liquid does not exist between the pattern and the optical plate while pressurizing the liquid.

10. The manufacturing method according to claim 9, further comprising covering the optical plate and the optical member with a protection member that encloses the optical plate before the optical plate is heated.

11. The manufacturing method according to claim 10, wherein the pressurizing the optical film and the optical plate comprises sealing the optical plate and the optical member within the protection member and processing the protection member covering the optical plate and the optical member to be vacuous.

12. A manufacturing method of a display device, the method comprising:
    forming an optical plate, and an optical film including a pattern disposed on a surface of the optical film;
    arranging the optical film and the optical plate to face each other in a protection member of a vacuum state therein so that the pattern faces the optical plate;
    immersing the protection member in a liquid;

heating the liquid to a heating temperature and pressurizing the liquid to a pressure to form an optical member, including the optical film and the optical plate, as a single unitary indivisible body;

separating the pressurized optical plate and the optical film from the protection member; and disposing the optical member under a display panel to emit a light to the display panel;

wherein the optical member is transparent.

13. The manufacturing method according to claim 12, wherein the heating and pressurizing the liquid induces pliability in the optical plate.

14. The manufacturing method according to claim 12, wherein the heating temperature ranges from about a glass transition temperature of the optical plate to about the glass transition temperature of the optical plate plus 30° C.

15. The manufacturing method according to claim 12, wherein the pattern includes a prism pattern.

16. The manufacturing method according to claim 12, wherein the forming the optical film includes forming the pattern by cross-linking polymers.

17. The manufacturing method according to claim 12, further comprising disposing a plurality of the protection members each including an optical film and an optical plate facing each other, and immersing the plurality of the protection members in the liquid before the heating and the pressurizing.

18. The manufacturing method according to claim 12, wherein the arranging the optical film and the optical plate to face each other includes, arranging a plurality of pairs each including an optical film and the optical plate in the protection member, and disposing a separation member between adjacent pairs.

* * * * *